(12) United States Patent
Chen et al.

(10) Patent No.: US 8,744,971 B2
(45) Date of Patent: Jun. 3, 2014

(54) DYNAMIC REDEMPTION CODES

(75) Inventors: Grace Chen, San Francisco, CA (US);
Jennifer Woldman, San Mateo, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 38 days.

(21) Appl. No.: 13/220,312

(22) Filed: Aug. 29, 2011

(65) Prior Publication Data

US 2013/0055409 A1 Feb. 28, 2013

(51) Int. Cl.
*G06F 21/00* (2013.01)
*G06Q 20/00* (2012.01)

(52) U.S. Cl.
USPC .......................................................... 705/51

(58) Field of Classification Search
USPC .............. 705/51, 16, 21, 59, 71; 380/44, 262, 380/278, 279
See application file for complete search history.

(56) References Cited

U.S. PATENT DOCUMENTS

| | | | |
|---|---|---|---|
| 6,915,271 B1 | 7/2005 | Meyer et al. | |
| 2002/0151294 A1 | 10/2002 | Kirby et al. | |
| 2002/0161631 A1 | 10/2002 | Banerjee et al. | |
| 2003/0216961 A1 | 11/2003 | Barry | |
| 2004/0177003 A1 * | 9/2004 | Liao et al. ........................ | 705/14 |
| 2005/0119938 A1 | 6/2005 | Smith et al. | |
| 2007/0112636 A1 | 5/2007 | Lucker et al. | |
| 2007/0118420 A1 | 5/2007 | Jung et al. | |
| 2008/0052169 A1 | 2/2008 | O'Shea et al. | |
| 2008/0154903 A1 | 6/2008 | Crowley et al. | |
| 2009/0192865 A1 | 7/2009 | Soza et al. | |
| 2011/0282725 A1 * | 11/2011 | Chatterjee et al. ......... | 705/14.24 |
| 2013/0054689 A1 | 2/2013 | Woldman | |
| 2013/0297393 A1 | 11/2013 | Chen | |

FOREIGN PATENT DOCUMENTS

| | | |
|---|---|---|
| WO | WO 00/60516 | 10/2000 |
| WO | WO 2013/032676 | 3/2013 |
| WO | WO 2013/032677 | 3/2013 |

OTHER PUBLICATIONS

PCT/US2012/050631 International Search Report and Written Opinion mailed Oct. 10, 2012.
PCT/US2012/050632 International Search Report and Written Opinion mailed Oct. 16, 2012.

* cited by examiner

*Primary Examiner* — Dante Ravetti
(74) *Attorney, Agent, or Firm* — Lewis Roca Rothgerber LLP

(57) ABSTRACT

Information regarding a redemption code may include at least one parameter associated with certain redeemable content. Requests may be received from a user. The request may concern access to redeemable content associated with a redemption code. The applicability of parameters is determined as is the redeemable content associated with the identified parameter. The user may then be granted access to the identified redeemable content. The determination of applicable parameters may include identifying an associated modification and applying the modification to the redemption code in order to identify the redeemable content.

20 Claims, 3 Drawing Sheets

DYNAMIC REDEMPTION CODES

BACKGROUND OF THE INVENTION

1. Field of the Invention

The present invention generally relates to redeemable content. More specifically, the present invention relates to dynamic codes for redeeming redeemable content.

2. Description of the Related Art

Presently available digital media may encompass a range of audio, video, video games, and other online and software applications. Publishers, developers, or owners of such digital media may wish to distribute such digital media for various purposes, including branding and product development. To maximize the impact and efficiency of the distribution, it would be useful to automate and target the distribution rather than simply rely upon manually implemented limits of the distribution.

For example, one presently available way to provide digital content is to provide a voucher or code that can be used to redeem content. One disadvantage to such an approach is that the content provider has limited options for controlling the conditions under which the content is distributed. The content provider may only wish to provide the content for a limited time only. Rarity of certain content may make the content more valuable and sought-after to user, thereby heightening brand recognition and brand associations without over-saturating the market. A publisher who wishes to provide such a rare and exclusive content may therefore wish to ensure that the content is only distributed a limited number of times. Possession by too many users may render that content less desirable, thereby undermining efforts to engage users.

Such as system as is presently available is also inflexible when the content provider may wish to update or refresh the content that is provided. New vouchers or redemption codes may have to be generated manually as the new or updated content becomes available. Such a process may require a significant amount of time and effort, rendering promotions more difficult to manage. A publisher with limited resources may not have the resources to run a promotional campaign with multiple, targeted offers.

There is, therefore, a need for improved systems and methods for providing dynamic redemption codes.

SUMMARY OF THE CLAIMED INVENTION

Embodiments of the present invention include systems and methods for providing dynamic redemption codes. Information regarding a redemption code may include at least one parameter associated with certain redeemable content. Requests may be received from a user. The request may concern access to redeemable content associated with a redemption code. It is determined what parameters may be applicable and what redeemable content is associated with the parameter determined to be applicable. The user may then be granted access to the identified redeemable content. In some embodiments, the determination of applicable parameters includes identifying an associated modification and applying the modification to the redemption code in order to identify the redeemable content.

Various embodiments of the present invention include methods for providing dynamic redemption codes. Such methods may include storing information regarding a redemption code including one or more parameters and redeemable content associated with each parameter; receiving a request concerning access to redeemable content associated with the redemption code, determining which of the one or more parameters is applicable, identifying the redeemable content associated with the parameter determined to be applicable, and granting the requesting user access to the identified redeemable content.

Embodiments of the present invention may further include systems for providing dynamic redemption codes. Such systems may include a memory for storing information regarding a redemption code including one or more parameters and redeemable content associated with each parameter, an interface for receiving a request sent over a communication network from a requesting user concerning access to redeemable content associated with the redemption code, and a processor to determine which of the one or more parameters is applicable, identify the redeemable content associated with the parameter determined to be applicable, and grant the requesting user access to the identified redeemable content.

Other embodiments of the present invention include non-transitory computer-readable storage media on which is embodied instructions executable to provide dynamic redemption codes in general accordance with the method previously set forth above.

DETAILED DESCRIPTION

Embodiments of the present invention allow for providing redemption codes. Information is stored regarding a redemption code; such information may include one or more parameters and certain redeemable content associated with each parameter. A user may send a request concerning access to redeemable content associated with a certain redemption code. It is determined what parameters may be applicable. For example, the request may be received at a certain time following the start of a promotion. A modification associated with the parameter may be identified and applied to the redemption code. The user may then use the modified redemption code to gain access to redeemable content. An administrator may determine the parameters and what redeemable content is associated with each parameter. Different redeemable content may be provided at different times, for example.

Figure 1:
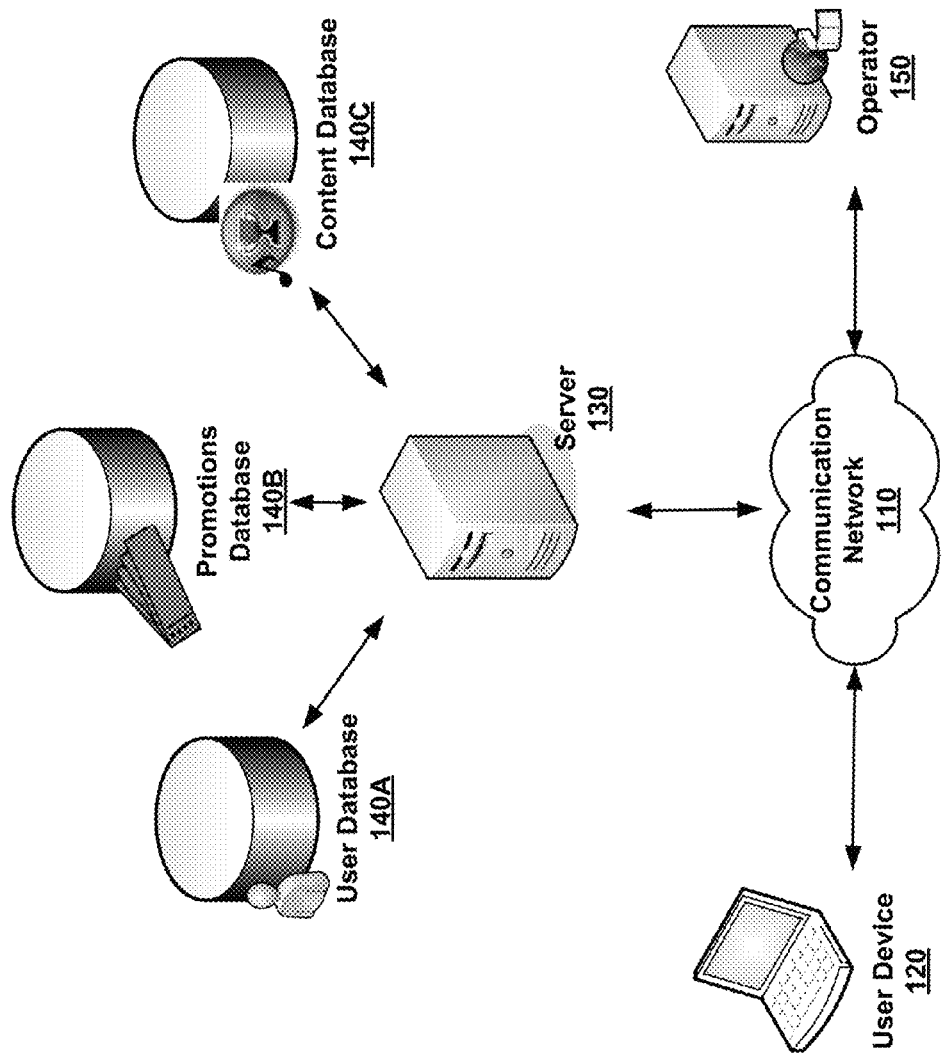
FIG. 1 illustrates an exemplary network environment in which a system for providing dynamic redemption codes may be implemented.

FIG. 1 illustrates an exemplary network environment 100 in which a system for providing redeemable content specific to groups may be implemented. In network environment 100, one or more user devices 120 may be in communication with a server 130, via a communication network 110. Server 130 may also be in communication with one or more databases 140, which may encompass a user database 140A, a promotions database 140B, and/or a redeemable content database 140C. In addition, an operator device 150 may also communicate with the other devices in network environment 100 via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of environment 100.

Users may use any number of different electronic user devices 120, such as mobile phones, smartphones, personal digital assistants (PDAs), portable computing devices (e.g., laptop, netbook, tablets), desktop computing devices, game console, handheld gaming device, or any other type of computing device capable of communicating over communication network 110. User device 120 may be further associated with or accessory to a general-purpose computer, a set-top box, a Blu-Ray® player, an electronic gaming system, or a home entertainment device (e.g., Sony PlayStation®3), as well as any one of a number of portable media devices (e.g., Sony PlayStation® Portable (PSP®)). Each user device 120 may also be configured to access data from other storage media, such as memory cards or disk drives as may be appropriate in the case of downloaded content. User device 120 may include standard computing components such as network and media interfaces, non-transitory computer-readable storage (memory), and processors for executing instructions that may be stored in memory.

Server 130 can receive and process communications sent by user devices 120. Server 130 may include any computing device as is known in the art, including standard computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may also receive a request sent by user device 120 concerning access to certain redeemable content, such as may be stored in redeemable content database 140C. Before access to that redeemable content is granted or denied, server 130 evaluates certain parameters to determine whether and what redeemable content to provide. For example, a publisher may have a promotion awarding one redeemable prize to users who redeem within the day, another redeemable prize to users who redeem within a week, and yet another redeemable prize to users who redeem within a month. A user request may include certain information (e.g., a redemption code, time of redemption) that may indicate or may be used to derive information regarding what parameters apply and what content is to be provided.

To facilitate the evaluation of the request, server 130 of FIG. 1 may consult with a user database 140A, a promotions database 140B, and/or a redeemable content database 140C. These databases 140A-C may be local or remote to the server 130. Further, the information in the databases 140A-C may also be stored separately as illustrated in FIG. 1, or aggregated in one location. Server 130 can access the stored data in the databases 140A-C and provide that data, or information derived from or related to the same, to user devices 120. Conversely, the server 130 may receive information from user devices 120 and store the same in any of user database 140A, promotions database 140B, and/or redeemable content database 140C, as is appropriate.

Upon receiving a request, server 130 may evaluate the request to determine who the requesting user is and what redeemable content is being requested. In some instances, the request may further explicitly indicate certain parameters to be applied to the request. Alternatively, server 130 may determine, based on information provided by a timer/clock, one of the databases 140A-140C, or a combination thereof, what parameters may apply to evaluation of the request. Finally, server 130 may determine whether to grant or deny access based on the information in the request, applicable parameters, and information stored in databases 140A-140C.

Information may be sent from the user device 120 or operator device 150 over the communication network 110 to the server 130 for storage in one or more databases, including a user database 140A, a promotions database 140B, and/or a redeemable content database 140C. The server 130 can later access data stored in any of the databases 140A-C for various purposes including providing specified redeemable content in response to requests. Databases 140A-C are discussed in more detail in conjunction with FIGS. 2A-C.

Operator device 150 may be associated with a publisher of a media title or any redeemable content, a systems administrator, a media franchise operator, or any party that wishes to make redeemable content available to users in network environment 100. Operator device 150 may be similar to user device 120 with respect to such standard computing components such as network and media interfaces, non-transitory computer-readable storage (memory), and processors for executing instructions that may be stored in memory. Operator device 150 allows an entity to communicate regarding any redeemable content the entity wishes to offer and to specify the parameters for accessing such redeemable content. For example, a game publisher may use operator device 150 to promote a game tournament to clans in a particular game title and to offer tournament-specific skins daily during the course of the tournament. A request for the skin may therefore be granted based on the day of the request and whether the request is received during the pendency of the tournament.

Figure 2C:
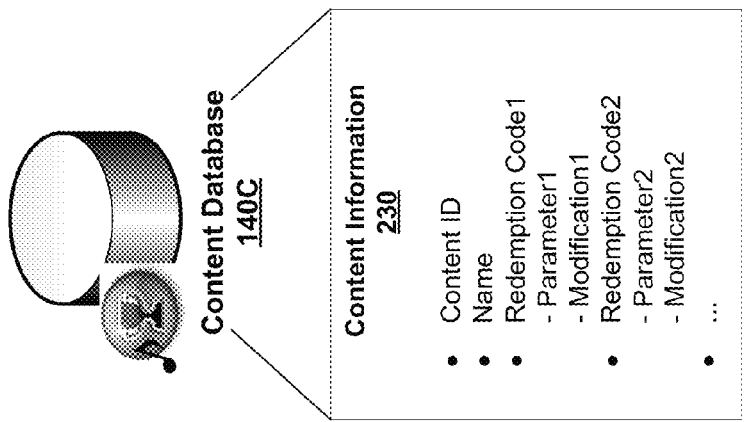
FIG. 2C illustrates a redeemable content database accessible to the server of FIG. 1.
Figure 2B:
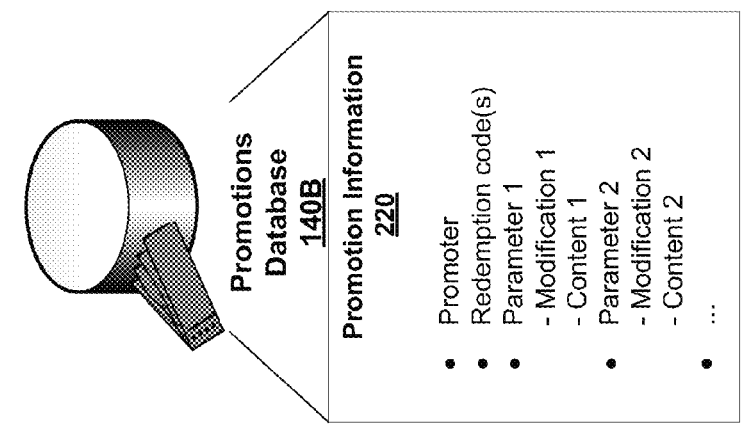
FIG. 2B illustrates a promotions database accessible to the server of FIG. 1.
Figure 2A:
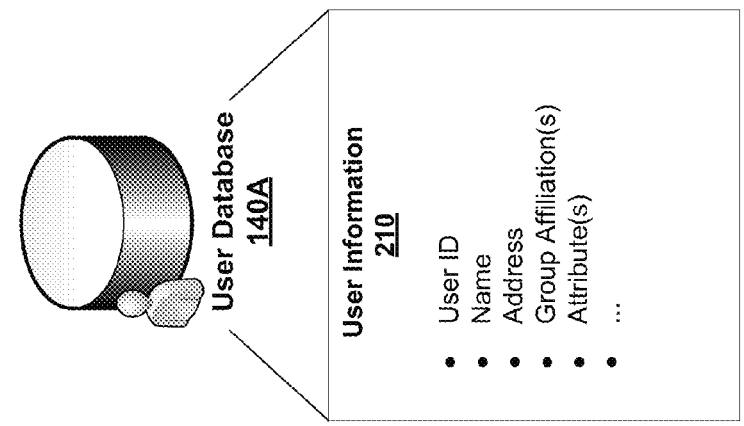
FIG. 2A illustrates a user database accessible to the server of FIG. 1.

FIG. 2A illustrates a user database 140A accessible to the server of FIG. 1. The user database 140A may include user information 210 with respect to a multitude of users. Any type of user information 210 may be stored for a particular user, including name, user identifier, address/geographic location, any user devices 120 associated with the user, any user attributes, any media titles associated with the user, purchase history, or play history. The user database 140A may receive information and/or updates concerning users based on a user registration, registration of a new user device 120, registration of new media titles, ongoing user behavior or interaction with respect to one of the media titles, registration for a service, and requests for updates.

A user may register—either manually or through an automatic exchange of data over network 110—for a user identifier and/or device identifier for user device 120. While a user identifier may specifically identify a particular user, a device identifier may be used by the server 130 to identify a particular user device and by extension, a user of the user device 120. In some instances, one identifier may be used to identify the user and various other user attributes, including user device 120, user location, group affiliation, and title affiliation. Such an identifier may be included in a request sent by the user to server 130. A first-time user may be prompted by the server 130 to enter certain user information, which may also be stored in user database 140A. Some information, such as group affiliation, may require approval (e.g., by a group leader) before being stored in user database 140A as a user attribute of the particular user.

FIG. 2B illustrates a promotions database 140B accessible to the server of FIG. 1. Promotions database 140B may include any information 220 related to a particular promotion in which redeemable content may be distributed. Promotions information 220 may include various redemption codes, parameters, associated modifications, and associated redeemable content. For example, a particular redemption code may be associated with various parameters (e.g., time of redemption or type of user device). Each parameter (e.g., within 1 hour, within 2 hours, within a day or PlayStation® 3, PSP®, PlayStation® Vita) may be associated with a different modification and/or different redeemable content. A publisher may therefore use a redemption code that may be modified based on applicable parameters. A redemption code may be published on a website, for example. Upon submission by a user, the redemption code may be modified according to the time of submission. One redemption code modified based on one submission time may be associated with different redeemable content than if the redemption code was modified based on a different submission time. Where the parameter relies on time of submission, the particular modification that is associated with the parameter may not be determined until the redemption code is submitted. As such, a user cannot simply hoard redemption codes, since they must be redeemed within certain parameters in order to access certain redeemable content.

Alternatively, the redemption code that is published may be automatically modified based on detection that a parameter is applicable. For example, when server 130 detects that 1 hour has passed since publication of the redemption code, server 130 may automatically apply the modification associated with the 1 hour parameter. The website may therefore provide the most up-to-date (modified) redemption code available, as well as notify the user as to what redeemable content is available to redeem (e.g., the redeemable content associated with the modified redemption code. The publication and modification of the redemption codes may be managed at the server 130, using such information as stored in promotions database 140B.

Promotions database 140B allows for the likes of publishers and systems administrators to track information regarding a particular promotion, distribute redeemable content according to specified parameters, and apply the parameters to automatically generate different redemption codes for new/different redeemable content. Any type of parameter known in the art for targeting redeemable content may be used to distribute specified redeemable content in specified ways. Various combinations of parameters may further provide that certain content be available based on user attributes, group membership/affiliations, and/or on the number of previous redemptions. A publisher may wish to distribute one type of content to the first 100 users, for example, another type of content to the next 500 users, and yet another type of content to everyone else. As such, a redemption code may be modified based on how many previous users have used the same version of the redemption code.

FIG. 2C illustrates a redeemable content database 140C accessible to the server of FIG. 1. The redeemable content database 140C may include a variety of redeemable content 230. Redeemable content 230 may be associated with a particular media title, family of titles, publisher, exclusivity information, requirements for access (e.g., group affiliation), redemption codes, requirements to use the redemption codes, or combinations of the same. The information in redeemable content database 140C (and databases 140A-B) may be cross-populated with information from user registrations, from publishers, promotion registrations, content registrations, user/publisher updates, or a combination of the foregoing. Redeemable content 230 may be provided by any entity, including users themselves, publishers, systems administrators, and other content (or service) providers.

Redeemable content 230 may include any kind of content or service that can be delivered digitally over communication network 110. Such redeemable content may include the ability to receive or be associated with a digital trophy related to game play or certain achievements therein. Redeemable content 230 may also include upgrades or improvements in interactions with a particular media title. For example, improved audio-visual quality in the play of a media title may be provided, such that the level of audio-visual quality is superior to a level of audio-visual quality available to users without access to the redeemable content.

The redeemable content 230 may alternatively or further include the ability to customize play of or interaction with the media title. For example, a user may be able to design or change aspects of different levels of game play or DVD play. Changes may also be decorative and include skinning (e.g., decorative, customized) or allow for the introduction of particular visual interfaces or other overlays. Customization may also apply to introduction of sound effects and/or the ability to introduce certain sound effects in response to occurrence of certain events or at certain points of play of the digital medium. Customization may also include the ability to configure a control device associated with interacting with the content. For example, a user may not desire to play a game using a default controller configuration. Redeemable content 230 with respect to customization may include allowing a user to reconfigure how a particular button or other interaction input on a control device results in a change or reaction with respect to the digital medium (e.g., movement of a character).

Other redeemable content 230 might include additional or enhanced abilities for the group in a video game. For example, a game character belonging to a group member might enjoy enhanced strength or stamina or receive certain powers not otherwise available to that character. Such enhancements or abilities might be specific to a character associated with a single group member or might apply to a family of characters associated with the group or other characters that collectively belong to the group.

Further redeemable content 230 may include additional modes of game play or tutorials related to game play whereby a group may receive special instructions or training as to certain maneuvers or in-game interactions. A group might also be rewarded with an additional save point for a video game whereby the save point allows game play information to be saved at a designated moment in game play. As a result, the group is able to restart or 'backup' to the information at the save point rather than start over from the beginning of game play or an earlier save point that might not reflect certain efforts or accomplishments achieved since that prior save point.

Redeemable content 230 may also include related literature or media or other information about the game or media. Such information might include previews or exclusive news or other information concerning upgrades and future releases. Redeemable content 230 may also encompass discounts on related purchases either in the game or in the real world and associated with the game or media (e.g., a discount on a second movie in a series or the next release in a video game franchise). Redeemable content 230 may also include redeemable points that may be used to acquire various prizes or objects in the game or in the real world.

Such redeemable content 230 may, in some instances, be portable to other media titles. For example, a user or group may receive a special skin in one game title and be able to use that skin in another title. As such, the group may be able to migrate from one game title to the other without losing certain advantages, skills, and awards that the group has accumulated over time. A publisher may wish to offer such portability of content to encourage group migration into new media titles. Many of the social interactions of the group may therefore be preserved and leveraged to increase interest and/or to promote certain titles and events. For example, a game publisher may provide event-specific content to users (and groups) who participate in a particular game tournament.

The amount and type of redeemable content 230 that is available may vary from title to title. Further, new redeemable content 230 may become available over time. The redeemable content 230 may be provided through downloading content from redeemable content database 140C as permitted by server 130 to user device 120. In some cases, the content of the reward may already be stored on a digital medium, but inaccessible until it is determined that the user belongs to a particular group eligible to receive the redeemable content 230.

Figure 3:
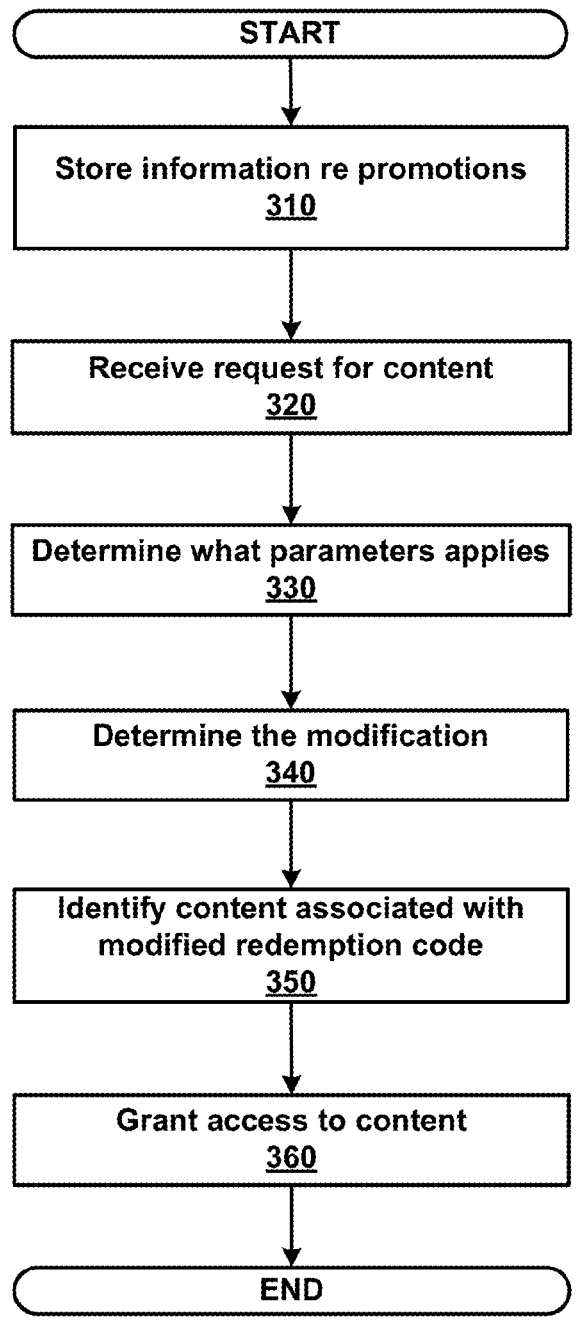
FIG. 3 is a flowchart illustrating an exemplary method for providing dynamic redemption codes.

FIG. 3 is a flowchart illustrating an exemplary method 300 for providing dynamic redemption codes. The method 300 of FIG. 3 may be embodied as executable instructions embodied in a computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 as illustrated in FIG. 3, information is stored regarding a plurality of redemption codes, a request for redeemable content is received, and it is determined what are applicable. In some instances, the request may include an identifier indicating the identity of the requesting user, as well as other information indicative of applicability of a parameter (e.g., time of submission). The evaluation of the parameter therefore may include identifying the time of submission and the redeemable content is associated with that time of submission. The user may then be allowed access to the redeemable content identified as being associated with the time of submission.

In step 310, information is maintained in databases 140A-C. Databases 140A-C may encompass one or multiple databases for storing information regarding users, redemption codes, and redeemable content. Such information may be provided by the users, designated information sources, publishers of media titles, marketing/promotions, systems administrators, and content/service providers. Databases 140A-C may collectively serve as a repository for information used to manage and target distribution of content to particular users under defined parameters.

In an exemplary embodiment, a publisher may wish to promote a particular media title by offering redeemable content. Using operator device 150, the publisher may define a particular promotion such that certain redeemable content may be distributed if certain parameters are met. For example, the publisher may provide certain redeemable content prior to the release date of the media title, different redeemable content during the first week after the release date, and further redeemable content afterwards. The publisher may only need to specify which redeemable content is to be associated with which parameters. The redemption code(s), and various modifications thereof, may be automatically generated for use in distributing the redeemable content to the target audience. The redemption codes themselves may be distributed or published according to any method known in the art, including packaging with distributed software, via a post on a website, social network profile, or blog; sent via email, instant message, SMS text messages, or Twitter® messaging service.

In step 320, a request is received at a server 130 or other computing device tasked with determining whether and how to distribute the requested content. The request may be submitted by any method known in the part, including via email, instant message, SMS text message, or clicking on a button or hyperlink. The request may concern access to redeemable content associated with a promotion and include additional information (e.g., an identifier associated with the requesting user, time of submission, redemption code) that may be used to process the request. Server 130 may determine that the request pertains to redeemable content associated with a particular promotion by looking up request information in one or more databases (e.g., promotions database 140B, content database 140C). Server 130 may search redeemable content database 140C to identify the redeemable content 230 being requested, as well as the parameters governing use (and/or modification) of the redemption code to redeem such content. In some embodiments, when a user initiates a request for certain content (or uses a certain redemption code), the user device 120 may automatically generate a request that is tailored to the particular requirements of the redeemable content (or redemption code). In some instances, a publisher may use a single redemption code to offer a series of redeemable content. Multiple users may therefore use the same redemption code to access redeemable content under various circumstances.

In step 330, it is determined what parameters are applicable to distribute the requested promotional content to the requesting user. In some embodiments, the information included in the request may be indicative of what redeemable content to provide under which circumstances. A redemption code included in the request may be associated with metadata, for example, indicating the particular parameters that may be applicable and the particular redeemable content to provide where certain parameters are found to be applicable. Alternatively, server 130 may need to consult various sources of data (e.g., clock, calendar, databases 140A-C) and evaluate the same to determine what parameters are applicable. For example, a parameter may concern a time of day when the request was submitted. The time of submission may be explicitly included in the request or determined based on when the request was received. Where the information provided in the request may not be sufficient to provide such information regarding a parameter, server 130 may look up additional information in databases 140A-140C. Any database may indicate up-to-date information regarding certain parameters (e.g., how many requests have been previously submitted under the promotion). The publisher therefore has the ability to specify the precise nature of the redeemable content 230 with respect to certain parameters. As such, a single redemption code may also be used for a promotions program in which different redeemable content 230 may be provided under various circumstances.

In step 340, it is determined what modification to apply to the redemption code. As noted with respect to steps 320 and 330, a redemption code may have been provided in the request or a redemption code may be retrieved using such information as provided in the request. In either case, the appropriate promotion is identified, and the applicable parameters are determined. Based on the applicable parameters, a modification to a redemption code may be identified. For example, such a modification may occur with respect to a dynamic portion of the redemption code which may be appended to the rest of the redemption code. The particular parameters identified as being applicable may have been specified by the likes of a publisher or administrator as being associated with a particular modification. Modifications may include addition, change, or removal of one or more characters in a redemption code string. Any type of redemption code and any type of modification such as known in the art may be used in this context. The particular modification may be applied to generate a modified redemption code.

In step 350, the particular redeemable content 230 associated with the modified redemption code is identified. In order to make different redeemable content 230 available under different parameters, a single redemption code may be modified as described in step 340 to generate new redemption codes specific to the applicable parameters. The new redemption codes may be generated as applicable parameters are detected or upon submission of a request, depending on the preferences indicated by the entity running the promotion.

In step 360, access to the redeemable content identified in step 350 is granted. A notification or message may be sent to notify the requesting user regarding such grant of access. The message may be sent to the user device 120 associated with the requesting user, or alternatively, to an email address associated with the requesting user. In cases where the redeemable content 230 is downloadable or streamed, the message may include the link for automatic download or streaming, as well as any required passwords. Alternatively, the message may include the redeemable content 230 as an attachment or otherwise provide or facilitate access to the redeemable content 230. Where appropriate, the message may further include information or instructions regarding the various rights or privileges associated with the redeemable content 230.

While the foregoing system and methodology has been described with respect to providing redeemable content having added benefits, the foregoing may, in fact, be a standard component, right, ability or other aspect of interaction with the media title. Upon a determination that a user or group has certain undesirable attributes, such content might be denied, limited, or provided in only limited circumstances. This may be accomplished by server 130 sending a signal or other information to user device 120 that causes certain content to be disabled or otherwise "blocked." Upon upgrading or providing updated information, the "block" may be removed and the content may be restored.

The present invention may be implemented in an application that may be operable using a variety of end user devices. For example, an end user device may be a personal computer, a home entertainment system (e.g., Sony PlayStation2® or Sony PlayStation3®), a portable gaming device (e.g., Sony PSP®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing a dynamic redemption code, the method comprising:
    associating, by a server, redeemable content with the dynamic redemption code;
    storing, by the server, information in memory regarding a plurality of dynamic redemption codes, wherein the stored information:
        includes one or more parameters associated with a code modification and redeemable content associated with each dynamic redemption code, and
        indicates that the code modification is to be applied based on a determination that at least one of the associated parameters is applicable;
    receiving, by the server, a request sent over a communication network from a requesting user, the request concerning access to redeemable content associated with the dynamic redemption code;
    monitoring, by the server, applicability of the one or more parameters;
    determining, by the server, an applicable parameter from the one or more parameters stored in memory;
    applying, by the server, a modification to the dynamic redemption code based on the parameter determined to be applicable, wherein the modification to the dynamic redemption code is automatically applied based on determining the applicable parameter;
    identifying, by the server, the redeemable content associated with the modified dynamic redemption code as indicated by the stored information in memory; and granting, by the server, the requesting user access to the identified redeemable content, wherein the identified redeemable content is accessible over the communication network.

2. The method of claim 1, wherein the information stored in memory further indicates that the dynamic redemption code is associated with a set of redeemable content and the redeemable content associated with each parameter is selected from the set of redeemable content.

3. The method of claim 2, wherein the information stored in memory further indicates that each parameter is associated with a modification to the dynamic redemption code and identification of the redeemable content includes applying the modification associated with the determined parameter to the redemption code, and identifying redeemable content associated with the modified dynamic redemption code.

4. The method of claim 3, wherein the dynamic redemption code comprises a dynamic portion and wherein the modification is applied to the dynamic portion.

5. The method of claim 4, wherein applying the modification includes appending the dynamic portion to the dynamic redemption code.

6. The method of claim 1, wherein the information stored in memory further indicates that the one or more parameters includes a time period of redemption and wherein determination of which of the parameters are applicable includes identifying the time period in which the request for the redeemable content is submitted.

7. The method of claim 1, wherein the stored information in memory further indicates that the one or more parameters includes a number of previous redemptions, and determination of the applicable parameters includes identifying a number of requests previously received including the dynamic redemption code.

8. The method of claim 7, wherein the stored information in memory regarding the one or more parameters and the redeemable content associated with each parameter are specified by a system administrator.

9. The method of claim 1, wherein the stored information in memory further indicates that the dynamic redemption code is associated with metadata indicating the one or more parameters and the redeemable content associated with each parameter.

10. A non-transitory computer-readable storage medium, having embodied thereon a program executable by a processor, wherein execution by the processor causes the processor to perform the method of:
    associating redeemable content with the dynamic redemption code;
    storing information regarding a plurality of dynamic redemption codes, wherein the stored information:
        includes one or more parameters associated with a code modification and redeemable content associated with each dynamic redemption code, and
        indicates that the code modification is to be applied based on a determination that at least one of the associated parameters is applicable;
    receiving a request sent from a requesting user, the request concerning access to redeemable content associated with the redemption code;
    monitoring applicability of the one or more parameters;
    determining an applicable parameter from the one or more parameters stored in memory;
    applying a modification to the dynamic redemption code based on the parameter determined to be applicable, wherein the modification is automatically applied based on the determination of the applicable parameter;
    identifying the redeemable content associated with the modified dynamic redemption code as indicated by the stored information in memory; and
    granting the requesting user access to the identified redeemable content, wherein the identified redeemable content is accessible over the communication network.

11. The method of claim 1, wherein the redeemable content includes an upgrade to a media title accessible to the requesting user.

12. The method of claim 11, wherein the upgrade relates to audio-visual quality of the media title.

13. The method of claim 11, wherein the upgrade relates a customizability of a feature of the media title.

14. The method of claim 12, wherein the customizability relates to modifying visual appearance of the media title.

15. The method of claim 12, wherein the customizability relates to modifying sound effects in the media title.

16. The method of claim 12, wherein the customizability relates to configuration of a control device associated with interaction with the media title.

17. The method of claim 11, wherein the upgrade relates to an additional or enhanced ability of one or more characters in the media title.

18. The method of claim 17, wherein the one or more characters are associated with a group of users of the media title.

19. The method of claim 11, wherein the upgrade is portable to another media title associated with the media title.

20. The method of claim 11, wherein the upgrade includes additional content associated with the media title.

* * * * *